United States Patent
Chen et al.

(10) Patent No.: US 12,524,677 B2
(45) Date of Patent: Jan. 13, 2026

(54) GENERATING UNSUPERVISED ADVERSARIAL EXAMPLES FOR MACHINE LEARNING

(71) Applicants: International Business Machines Corporation, Armonk, NY (US); National Chung Hsing University, Taichung (TW)

(72) Inventors: Pin-Yu Chen, White Plains, NY (US); Chia-Yi Hsu, Taipei (TW); Songtao Lu, White Plains, NY (US); Sijia Liu, Somerville, MA (US); Chuang Gan, Cambridge, MA (US); Chia-Mu Yu, Hsinchu (TW)

(73) Assignees: International Business Machines Corporation, Armonk, NY (US); NATIONAL CHUNG HSING UNIVERSITY, Taichung (TW)

( * ) Notice: Subject to any disclaimer, the term of this patent is extended or adjusted under 35 U.S.C. 154(b) by 1323 days.

(21) Appl. No.: 17/157,077

(22) Filed: Jan. 25, 2021

(65) Prior Publication Data
US 2022/0253714 A1 Aug. 11, 2022

(51) Int. Cl.
*G06N 3/088* (2023.01)
*G06N 3/045* (2023.01)

(52) U.S. Cl.
CPC ............. *G06N 3/088* (2013.01); *G06N 3/045* (2023.01)

(58) Field of Classification Search
CPC ............................... G06N 3/088; G06N 3/045
See application file for complete search history.

(56) References Cited

U.S. PATENT DOCUMENTS

| | | | |
|---|---|---|---|
| 10,474,929 B2 | 11/2019 | Choi et al. | |
| 10,643,602 B2 | 5/2020 | Li et al. | |
| 10,698,063 B2 | 6/2020 | Braun et al. | |
| 10,706,534 B2 | 7/2020 | Middlebrooks et al. | |
| 11,494,667 B2* | 11/2022 | Carbune | G06N 5/04 |
| 2019/0197368 A1* | 6/2019 | Madani | G16H 30/40 |
| 2019/0385018 A1* | 12/2019 | Ngo Dinh | G06N 3/045 |

(Continued)

FOREIGN PATENT DOCUMENTS

| | | | | |
|---|---|---|---|---|
| EP | 4149110 A1 * | 3/2023 | | G06T 7/55 |
| WO | WO-2020093987 A1 * | 5/2020 | | G06T 17/00 |

OTHER PUBLICATIONS

Belghazi MI, Baratin A, Rajeshwar S, Ozair S, Bengio Y, Courville A, Hjelm D. Mutual information neural estimation. InInternational conference on machine learning Jul. 3, 2018 (pp. 531-540). PMLR. (Year: 2018).*

(Continued)

*Primary Examiner* — Oluwatosin Alabi
(74) *Attorney, Agent, or Firm* — Scully, Scott, Murphy & Presser, P.C.; Caleb Wilkes (57) ABSTRACT

A trained machine learning model and a training dataset used to train the trained machine learning model can be received. Based on the training dataset, unsupervised adversarial examples can be generated. Robustness of the trained machine learning model can be determined using the generated unsupervised adversarial examples. The training dataset can be augmented with the generated unsupervised adversarial examples. The trained machine learning model can be retrained using the augmented training dataset.

15 Claims, 6 Drawing Sheets

(56) References Cited

U.S. PATENT DOCUMENTS

| | | | |
|---|---|---|---|
| 2020/0293890 A1 | 9/2020 | Baker | |
| 2020/0320371 A1 | 10/2020 | Baker | |
| 2020/0372301 A1* | 11/2020 | Kearney | G06N 3/047 |
| 2021/0067549 A1* | 3/2021 | Chen | G06N 3/084 |
| 2021/0150310 A1* | 5/2021 | Wu | G06T 11/60 |
| 2022/0077944 A1* | 3/2022 | Zou | H04W 4/33 |
| 2023/0260083 A1* | 8/2023 | Edlund | G06T 3/4046 |
| | | | 382/156 |

OTHER PUBLICATIONS

Kwak H, Zhang BT. Ways of conditioning generative adversarial networks. arXiv preprint arXiv:1611.01455. Nov. 4, 2016. (Year: 2016).*

Wu E, Cui H, Welsch RE. Dual autoencoders generative adversarial network for imbalanced classification problem. IEEE Access. May 13, 2020;8:91265-75. (Year: 2020).*

Duan Y, Tao X, Xu M, Han C, Lu J. GAN-NL: Unsupervised representation learning for remote sensing image classification. In2018 IEEE Global Conference on Signal and Information Processing (GlobalSIP) Nov. 26, 2018 (pp. 375-379). IEEE. (Year: 2018).*

Kang, Minguk, and Jaesik Park. "Contragan: Contrastive learning for conditional image generation." Advances in Neural Information Processing Systems 33 (2020): 21357-21369. (Year: 2020).*

Dutta IK, Ghosh B, Carlson A, Totaro M, Bayoumi M. Generative adversarial networks in security: A survey. In2020 11th IEEE Annual Ubiquitous Computing, Electronics & Mobile Communication Conference (UEMCON) Oct. 28, 2020 (pp. 0399-0405). IEEE. (Year: 2020).*

Spampinato, C., et al., "Adversarial Framework for Unsupervised Learning of Motion Dynamics in Videos", Computer Science, International Journal of Computer Vision, 2019, 19 pages.

Donahue, J., et al., "Large Scale Adversarial Representation Learning", 33rd Conference on Neural Information Processing Systems (NeurIPS 2019), 2019, 11 pages.

Shrivastava, A., et al., "Learning from Simulated and Unsupervised Images through Adversarial Training", 2017 IEEE Conference on Computer Vision and Pattern Recognition (CVPR), Jul. 21-26, 2017, pp. 2107-2116.

Anonymous, "Serving Multiple Anatomies and Protocols with an Unsupervised Gating Mechanism for Deep Learning Models", An IP.com Prior Art Database Technical Disclosure, IPCOM000263846D, Oct. 9, 2020, 7 pages.

Anonymous, "Ranking and Automatic Selection of Machine Learning Models", An IP.com Prior Art Database Technical Disclosure, IPCOM000252275D, Jan. 3, 2018, 34 pages.

Anonymous, Automatically Scaling Multi-Tenant Machine Learning, an IP.com Prior Art Database Technical Disclosure, IPCOM000252098D, Dec. 15, 2017, 35 pages.

Athalye, A., et al., "Obfuscated Gradients Give a False Sense of Security: Circumventing Defenses to Adversarial Examples", Proceedings of the 35 th International Conference on Machine Learning, PMLR 80, 2018, arXiv:1802.00420v4, Jul. 31, 2018, 12 pages.

Abid, A., et al., "Concrete Autoencoders: Differentiable Feature Selection and Reconstruction", arXiv:1901.09346v2, Jan. 31, 2019, 16 pages.

Belghazi, M.I., et al., "Mutual Information Neural Estimation", Proceedings of the 35 th International Conference on Machine Learning, PMLR 80, 2018, arXiv:1801.04062v4, Jun. 7, 2018, 18 pages.

Biggio, B., et al., "Wild Patterns: Ten Years After the Rise of Adversarial Machine Learning", arXiv:1712.03141v2, Jul. 19, 2018, 17 pages.

Binkowski, M., et al., "Demystifying MMD GANs", Published as a conference paper at ICLR 2018, arXiv:1801.01401v5, Jan. 14, 2021, 36 pages.

Brendel, W., et al., "Decision-Based Adversarial Attacks: Reliable Attacks Against Black-Box Machine Learning Models", Published as a conference paper at ICLR 2018, 2018, 12 pages.

Candes, E. J., et al., "An Introduction to Compressive Sampling", IEEE Signal Processing Magazine, Mar. 2008, pp. 21-30, 25(2).

Carlini, N., et al., "Adversarial Examples Are Not Easily Detected: Bypassing Ten Detection Methods", AISec'17, Nov. 3, 2017, pp. 3-14.

Carlini, N., et al., "Towards Evaluating the Robustness of Neural Networks", arXiv:1608.04644v2, Mar. 22, 2017, 19 pages.

Cavallari, G.B., et al., "Unsupervised representation learning using convolutional and stacked auto-encoders: a domain and cross-domain feature space analysis", arXiv:1811.00473v1, Nov. 1, 2018, 7 pages.

Chen, P.Y., et al., "ZOO: Zeroth Order Optimization Based Black-box Attacks to Deep Neural Networks Without Training Substitute Models", AISec'17, Nov. 3, 2017, arXiv:1708.03999v2, Nov. 2, 2017, 13 pages.

Donsker, M.D., et al., "Asymptotic Evaluation of Certain Markov Process Expectations for Large Time. IV", Communications on Pure and Applied Mathematics, Received Aug. 1982, pp. 183-212, vol. 36 (1983).

Geurts, P., et al., "Extremely randomized trees", Machine Learning 2006, Revised Oct. 29, 2005, Accepted Nov. 15, 2005, Published online Mar. 2, 2006, pp. 3-42, 63.

Goodfellow, I.J., et al., "Explaining and Harnessing Adversarial Examples", Published as a conference paper at ICLR 2015, arXiv:1412.6572v3, Mar. 20, 2015, 11 pages.

Heusel, M., et al., "GANs Trained by a Two Time-Scale Update Rule Converge to a Local Nash Equilibrium", 31st Conference on Neural Information Processing Systems (NIPS 2017), Dec. 2017, 12 pages.

Hjelm, R. D., et al., "Learning deep representations by mutual information estimation and maximization", Published as a conference paper at ICLR 2019, arXiv:1808.06670v5, Feb. 22, 2019, 24 pages.

Liu, S., et al., "Min-max optimization without gradients: Convergence and applications to black-box evasion and poisoning attacks", Proceedings of the 37 th International Conference on Machine Learning PMLR vol. 119, Jul. 2020, 12 pages.

Lu, S., "Hybrid Block Successive Approximation for One-Sided Non-Convex Min-Max Problems: Algorithms and Applications", arXiv:1902.08294v1, Feb. 21, 2019, 31 pages.

Madry, A., et al., "Towards Deep Learning Models Resistant to Adversarial Attacks", arXiv:1706.06083v4, Sep. 4, 2019, 28 pages.

Makhzani, A., et al., "Adversarial autoencoders", arXiv:1511.05644v2, May 25, 2016, 16 pages.

Bhagoji, A.N., "Practical Black-box Attacks on Deep Neural Networks using Efficient Query Mechanisms", In Proceedings of the European Conference on Computer Vision (ECCV 2018), First Online Oct. 6, 2018, 16 pages.

Papernot, N., et al., "Practical black-box attacks against machine learning", Asia CCS '17, Apr. 2-6, 2017, arXiv:1602.02697v4, Mar. 19, 2017, 14 pages.

Ranzato, M.A., et al., "Unsupervised learning of invariant feature hierarchies with applications to object recognition", 2007 IEEE Conference on Computer Vision and Pattern Recognition, Jun. 17-22, 2007, 8 pages.

Razaviyayn, M., et al., "Nonconvex Min-Max Optimization: Applications, Challenges, and Recent Theoretical Advances", arXiv:2006.08141v2, Aug. 18, 2020, 12 pages.

Su, D., et al., "Is Robustness the Cost of Accuracy?—A Comprehensive Study on the Robustness of 18 Deep Image Classification Models", arXiv:1808.01688v2, Mar. 4, 2019, 24 pages.

Szegedy, C., et al., "Intriguing properties of neural networks", arXiv:1312.6199v4, Feb. 19, 2014, 10 pages.

Tishby, N., et al., "The information bottleneck method", Sep. 30, 1999, arXiv:physics/0004057v1, Apr. 24, 2000, 16 pages.

Tsipras, D., et al., "Robustness May Be at Odds with Accuracy", Published as a conference paper at ICLR 2019, Sep. 27, 2018, Modified Feb. 22, 2019, 23 pages.

(56) References Cited

OTHER PUBLICATIONS

Weng, T.-W., et al., "Evaluating the Robustness of Neural Networks: An Extreme Value Theory Approach", Published as a conference paper at ICLR 2018, arXiv:1801.10578v1, Jan. 31, 2018, 18 pages.
Zhai, X., et al., "S4I: Self-Supervised Semi-Supervised Learning", arXiv:1905.03670v2, Jul. 23, 2019, 13 pages.
Zhu, S., et al., "Learning Adversarially Robust Representations via Worst-Case Mutual Information Maximization", Proceedings of the 37th International Conference on Machine Learning, PMLR vol. 119, 2020, arXiv:2002.11798v2, Jul. 5, 2020, 19 pages.
Zhu, X., et al., "Introduction to Semi-Supervised Learning", Synthesis Lectures on Artificial Intelligence and Machine Learning, 130 pages.

\* cited by examiner

GENERATING UNSUPERVISED ADVERSARIAL EXAMPLES FOR MACHINE LEARNING

BACKGROUND

The present application relates generally to computers and computer applications, and more particularly to machine learning and generating adversarial examples for machine learning models.

Adding small perturbations to a clean data input can cause a well-trained model to make erroneous decisions. Adversarial examples causing such evasive predictions can be used to evaluate and improve the robustness of machine learning models. However, current studies on adversarial examples focus on supervised learning tasks, relying on the ground-truth data label, a targeted objective (e.g., a specific class label or a reference sample), or supervision from a trained classifier trained on labeled data, for generating adversarial examples.

BRIEF SUMMARY

The summary of the disclosure is given to aid understanding of a computer system, processor, and method of generating adversarial examples for machine learning, for example, unsupervised adversarial examples, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system, the architectural structure, processor, and/or their method of operation to achieve different effects.

A computer-implemented method in an aspect can include receiving a trained machine learning model and a training dataset used to train the trained machine learning model. The method can also include, based on the training dataset, generating unsupervised adversarial examples. The method can further include determining robustness of the trained machine learning model using the generated unsupervised adversarial examples.

In another aspect, a computer-implemented method can include receiving a trained machine learning model and a training dataset used to train the trained machine learning model. The method can also include, based on the training dataset, generating unsupervised adversarial examples by using a per-sample mutual information neural estimator for measuring similarity between an adversarial sample and an original sample from the training dataset, where the generating finds an adversarial example which is least similar to the original sample, while also satisfying an adversarial criterion that the adversarial example's loss is less than that of the original sample. The method can further include determining robustness of the trained machine learning model using the generated unsupervised adversarial examples.

In another aspect, a computer-implemented method can include receiving a trained machine learning model and a training dataset used to train the trained machine learning model. The method can also include, based on the training dataset, generating unsupervised adversarial examples by using a per-sample mutual information neural estimator for measuring similarity between an adversarial sample and an original sample from the training dataset, where adversarial sample is randomly sampled, wherein the generating finds an adversarial example which is least similar to the original sample, while also satisfying an adversarial criterion that the adversarial example's loss is less than that of the original sample. The method can further include determining robustness of the trained machine learning model using the generated unsupervised adversarial examples.

In another aspect, a computer-implemented method can include receiving a trained machine learning model and a training dataset used to train the trained machine learning model. The method can also include, based on the training dataset, generating unsupervised adversarial examples by using a per-sample mutual information neural estimator for measuring similarity between an adversarial sample and an original sample from the training dataset, where the adversarial sample is sampled using an output of a convolutional layer of the trained machine learning model, wherein the generating finds an adversarial example which is least similar to the original sample, while also satisfying an adversarial criterion that the adversarial example's loss is less than that of the original sample. The method can further include determining robustness of the trained machine learning model using the generated unsupervised adversarial examples.

In another aspect, a computer-implemented method can include receiving a trained machine learning model and a training dataset used to train the trained machine learning model. The method can also include, based on the training dataset, generating unsupervised adversarial examples. The method can further include determining robustness of the trained machine learning model using the generated unsupervised adversarial examples. The method can further include augmenting the training dataset with the generated unsupervised adversarial examples.

In another aspect, a computer-implemented method can include receiving a trained machine learning model and a training dataset used to train the trained machine learning model. The method can also include, based on the training dataset, generating unsupervised adversarial examples. The method can further include determining robustness of the trained machine learning model using the generated unsupervised adversarial examples. The method can further include augmenting the training dataset with the generated unsupervised adversarial examples. The method can further include retraining the trained machine learning model using the augmented training dataset.

In another aspect, a computer-implemented method can include receiving a trained machine learning model and a training dataset used to train the trained machine learning model. The trained machine learning model can include an unsupervised machine learning model. The method can also include, based on the training dataset, generating unsupervised adversarial examples. The method can further include determining robustness of the trained machine learning model using the generated unsupervised adversarial examples.

In another aspect, a computer-implemented method can include receiving a trained machine learning model and a training dataset used to train the trained machine learning model. The method can further include, based on the training dataset, generating unsupervised adversarial examples. The method can further include augmenting the training dataset with the generated unsupervised adversarial examples. The method can further include retraining the trained machine learning model using the augmented training dataset.

In another aspect, a computer-implemented method can include receiving a trained machine learning model and a training dataset used to train the trained machine learning model. The method can also include, based on the training dataset, generating unsupervised adversarial examples by using a per-sample mutual information neural estimator for measuring similarity between an adversarial sample and an original sample from the training dataset, where the generating finds an adversarial example which is least similar to the original sample, while also satisfying an adversarial criterion that the adversarial example's loss is less than that of the original sample. The method can further include augmenting the training dataset with the generated unsupervised adversarial examples. The method can further include retraining the trained machine learning model using the augmented training dataset.

In another aspect, a computer-implemented method can include receiving a trained machine learning model and a training dataset used to train the trained machine learning model. The method can also include, based on the training dataset, generating unsupervised adversarial examples by using a per-sample mutual information neural estimator for measuring similarity between an adversarial sample and an original sample from the training dataset, where the adversarial sample is randomly sampled, where the generating finds an adversarial example which is least similar to the original sample, while also satisfying an adversarial criterion that the adversarial example's loss is less than that of the original sample. The method can further include augmenting the training dataset with the generated unsupervised adversarial examples. The method can further include retraining the trained machine learning model using the augmented training dataset.

In another aspect, a computer-implemented method can include receiving a trained machine learning model and a training dataset used to train the trained machine learning model. The method can also include, based on the training dataset, generating unsupervised adversarial examples by using a per-sample mutual information neural estimator for measuring similarity between an adversarial sample and an original sample from the training dataset, where the adversarial sample is sampled using an output of a convolutional layer of the trained machine learning model, where the generating finds an adversarial example which is least similar to the original sample, while also satisfying an adversarial criterion that the adversarial example's loss is less than that of the original sample. The method can further include augmenting the training dataset with the generated unsupervised adversarial examples. The method can further include retraining the trained machine learning model using the augmented training dataset.

A system in an aspect can include a hardware processor and a memory device coupled with the hardware processor. The hardware processor can be configured to receive a trained machine learning model and a training dataset used to train the trained machine learning model. The hardware processor can also be configured to, based on the training dataset, generate unsupervised adversarial examples. The hardware processor can also be configured to determine robustness of the trained machine learning model using the generated unsupervised adversarial examples.

In another aspect, a system can include a hardware processor and a memory device coupled with the hardware processor. The hardware processor can be configured to receive a trained machine learning model and a training dataset used to train the trained machine learning model. The hardware processor can also be configured to, based on the training dataset, generate unsupervised adversarial examples. The hardware processor can also be configured to determine robustness of the trained machine learning model using the generated unsupervised adversarial examples. The hardware processor can also be configured to augment the training dataset with the generated unsupervised adversarial example. The hardware processor can also be configured to retrain the trained machine learning model using the augmented training dataset.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In one or more embodiments, systems and methods can be provided to generate data examples for machine learning, which can improve robustness of one or more machine learning models. The systems and methods in one or more embodiments can enhance model robustness to new and adversarial environments in machine learning. For example, in one or more embodiments, the systems and methods may receive or obtain a pre-trained model and training data and may evaluate robustness of the pre-trained model by generating and/or showing unsupervised adversarial examples. In one or more embodiments, the systems and methods may also provide for data augmentation, which can improve the pre-trained model. For instance, the pre-trained model can be retrained using the generated examples.

Adversarial examples are known as prediction-evasive attacks on machine learning models (e.g., deep neural networks), which are generated by manipulating native data samples while maintaining high similarity measured by task-specific metrics such as $L_p$-norm bounded perturbations. Adversarial examples can be used to evaluate robustness of a trained model and to enhance robustness during training (e.g., adversarial training).

In one or more embodiments, efficient robustness evaluation and data augmentation techniques are disclosed for unsupervised machine learning models through unsupervised adversarial examples (UAEs). In an aspect, UAE generation disclosed herein can be supervision-free. For example, the UAE generation may use an information-theoretic similarity measure and the associated unsupervised learning objective function. The UAE generation need not use any supervision such as label information or prediction from other supervised models.

In another aspect, an efficient framework for UAE generation can be provided. The UAEs can improve a variety of unsupervised machine learning tasks. In another aspect, a new per-sample based mutual information neural estimator between a pair of original and modified data samples as an information-theoretic similarity measure and a supervision-free approach for generating UAE are disclosed. The systems and methods can generate adversarial examples for unsupervised learning models as well as for supervised learning models. For example, the systems and methods can also use the per-sample mutual information neural estimator to generate adversarial examples for supervised learning models with improved visual quality.

In an embodiment, the systems and methods may formulate the generation of adversarial examples with mutual information neural estimator as a constrained optimization problem, which applies to both supervised and unsupervised machine learning tasks. The systems and methods may develop an efficient MinMax optimization algorithm, which includes convergence. In an aspect, the MinMax algorithm disclosed herein may have an advantage over the conventional penalty-based method.

In one or more embodiments, the systems and methods may provide for a novel application of UAEs as a plug-in data augmentation tool for one or more unsupervised machine learning tasks, for example, including data reconstruction, representation learning, and contrastive learning on image and tabular datasets. Machine learning models can be improved by retraining the model with the generated UAEs.

Figure 1:
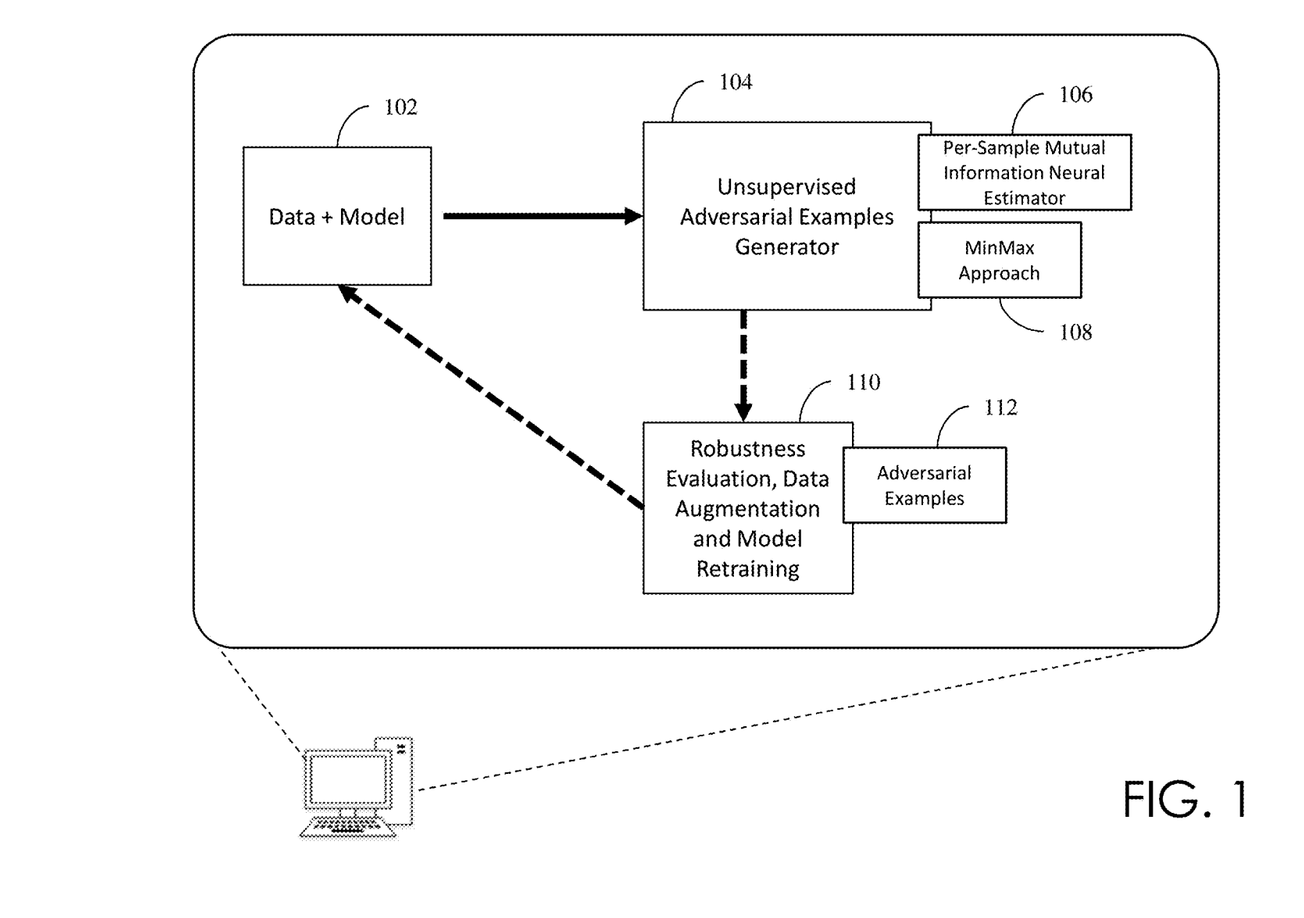
FIG. 1 is a block diagram illustrating components of a system in an embodiment.

FIG. 1 is a block diagram illustrating components of a system in an embodiment. The components shown include computer-implemented components, for instance, implemented and/or run on one or more processors such as computer or hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

The system may receive or obtain a pre-trained model and associated training data 102, used to train the model. The model can be any type of machine learning model. The training data can be any type of data. For example, the model and training data 102 can be user provided. A generator 104 generates unsupervised adversarial examples. For example, the geneartor 104 uses a per-sample mutual information neural estimator 106 and a minmax approach 108 to find unsupervised adversarial examples. In per-sample mutual information neural estimator processing, the generator 104 may use random sampling to generate a batch of compressed samples. In another embodiment, the generator 104 may use a convolution layer output (e.g., the first convolution layer output in convolutional neural network in image processing). The minmax approach 108 can find feasible unsupervised adversarial examples with least mutual information estimate A component 110 can perform robustness evaluation, data augmentation, and/or model retraining using the generated unsupervised adversarial examples 112. For example, the component 110 shows unsupervised adversarial examples 112 for robustness evaluation, use unsupervised adversarial examples 112 to perform data augmentation and retrain the model 102. For instance, the component 110 may display the found adversarial examples. By way of example, original images, unsupervised adversarial example, and reconstructed images reconstructed using the retrained model can be shown. The component 110 may also augment the training dataset with the unsupervised adversarial examples 112. The component 110 may retrain the model using the augmented training dataset. In an embodiment, finding unsupervised adversarial examples using the model and the training dataset, augmenting the training dataset and retraining the model can be repeated or iterated multiple times, for example, model→augmentation→retrain→model.

In an embodiment, the system uses a per-sample mutual information neural estimator 106 for measuring similarity between a pair of adversarial and original examples, e.g., the mutual information of a given data sample x and its perturbed sample x+δ, denoted by $I_\Theta(x, x+\delta)$. Using training data and a pre-trained model 102, the system in an embodiment finds the least similar example while satisfying the adversarial criterion that its loss is less than that of the original sample. For example, $$\underset{\delta}{\text{Minimize}}\ I_\Theta(x, x+\delta)$$

such that $x+\delta \in [0, 1]^d, \delta \in [-\varepsilon, \varepsilon]^d$ and $$f_x^{unsup}(x+\delta) \le 0$$

The first two constraints regulate the feasible data space and the perturbation range. For the $L_2$-norm reconstruction loss, the unsupervised attack function is $$f_x^{unsup}(x+\delta) = \|x-\Phi(x+\delta)\|_2 - \|x-\Phi(x)\|_2 + \kappa$$

which means the attack is considered successful (i.e., $f_x^{unsup}(x+\delta) \le 0$) if the reconstruction loss of x+δ relative to the original sample x is smaller than the native reconstruction loss minus a nonnegative margin κ. In an embodiment, the system implements a minimax approach 108 to efficiently find unsupervised adversarial examples. In an embodiment, the system finds adversarial examples that have small training loss but are dissimilar to the native data.

Mutual Information Neural Estimator

Mutual information (MI) is a measure of the mutual dependence between two random variables X and Z. It can be formalized as $$I(X,Z) = H(X) - H(X|Z),$$

where H(X) denotes the (Shannon) entropy of X and H(X|Z) denotes the conditional entropy of X given Z. MI can be used to characterize the fundamental capacity and limitation of machine learning models, such as the information bottleneck of neural networks. The computation of MI can be difficult without knowing the marginal and joint probability distributions ($\mathbb{P}_X$, $\mathbb{P}_Z$, and $\mathbb{P}_{XZ}$) of X and Z, especially for continuous random variables.

For efficient computation of MI, the mutual information neural estimator with consistency guarantees can be used. Specifically, mutual information neural estimator aims to maximize the lower bound of the exact MI using a model parameterized by a neural network θ. defined as $$I_\Theta(X,Z) \leq I(X,Z),$$

where Θ is the space of feasible parameters of a neural network, and $I_\Theta(X, Z)$ is the neural information quantity defined as $$I_\Theta(X, Z) = \sup_{\theta \in \Theta} \mathbb{E}_{\mathbb{P}_{XZ}}[T_\theta] - \log(\mathbb{E}_{\mathbb{P}_X \otimes \mathbb{P}_Z}[e^{T_\theta}]).$$

The function $T_\theta$ is parameterized by a neural network θ based on the Donsker-Varadhan representation theorem. Mutual information neural estimator estimates the expectations of the quantities above by shuffling the samples from the joint distribution along the batch axis or using empirical samples $\{x_i, z_i\}_{i=1}^n$ from $\mathbb{P}_{XZ}$ and $\mathbb{P}_X \otimes \mathbb{P}_Z$ (the product of marginals).

Mutual information neural estimator can be used to improve representation learning given a dataset. To generate an adversarial example for a given data sample, the system disclosed herein can implement sampling methods for single data sample to enable the computation of MI.

In an embodiment, to generate an adversarial example of single data sample, namely, the mutual information of a given data sample x and its perturbed sample x+δ, denoted by $I_\Theta(x, x+\delta)$, the system implements random sampling and/or convolution output, to enable per-sample mutual information neural estimator.

Random Sampling

In an embodiment, the system can perform independent Gaussian sampling of a given data sample x to obtain a batch of K compressed samples $\{x_k, (x+\delta)_k\}_{k=1}^K$ for computing $I_\Theta(x, x+\delta)$ via mutual information neural estimator. In an embodiment, random sampling need not be aware of the underlying machine learning model since it directly applies to the data sample.

By way of example implementation, in an embodiment, the system can reshape an input data sample as a vector $x \in \mathbb{R}^d$ and independently generate K Gaussian random matrices $\{M_k\}_{k=1}^K$, where $M_k \in \mathbb{R}^{d' \times d}$. Each entry in $M_k$ can be an independent and identically distributed (i.i.d) zero-mean Gaussian random variable with standard deviation 1/d'. The compressed samples $\{x_k\}_{k=1}^K$ of x can be defined as $x_k = M_k x$. Similarly, the same random sampling procedure can be used on x+δ to obtain its compressed samples $\{(x+\delta)_k\}_{k=1}^K$. For example, the system can set d'=128 and K=500.

Convolution Layer Output

When the underlying neural network model uses a convolution layer to process the input data (e.g., in a setting for image data), the system can use the output of the first convolution layer of a data input, denoted by conv(·), to obtain K feature maps $\{conv(x)_k, conv(x+\delta)_k\}_{k=1}^K$ for computing $I_\Theta(x, x+\delta)$. For instance, a convolution-based per-sample mutual information neural estimator can be implemented.

By way of example implementation, given a data sample x, the system may fetch its output of the 1$^{st}$ convolutional layer, denoted by conv(x). The data dimension is d'×K, where K is the number of filters (feature maps) and d' is the (flattend) dimension of the feature map. Each filter can be regarded as a compressed sample denoted by conv(x)$_k$. Algorithm 2 summarizes an example approach in an embodiment, where the function $T_\theta$ is parameterized by a neural network θ based on the Donsker-Varadhan representation theorem, and $T_I$ is the number of iterations for training the MI neural estimator I(θ).

---

Algorithm 2
Per-sample mutual information neural estimator via Convolution

---

Input: input sample x, perturbed sample x + δ, 1st convolution layer output conv(·), MI neural estimator I(θ)
 1: Initialize neural network parameters θ
 2: Get $\{conv(x)_k\}_{k=1}^K$ and $\{conv(x + \delta)_k\}_{k=1}^K$ via 1$^{st}$ convolution layer
 3: for t in $T_I$ iterations do
 4:  Take K samples from the joint distribution: $\{conv(x)_k, conv(x + \delta)_k\}_{k=1}^K$
 5:  Shuffle K samples from conv(x + δ) marginal distribution: $\{conv(x + \delta)_{(k)}\}_{k=1}^K$
 6:  Evaluate $$I(\theta) \leftarrow \frac{1}{K}\sum_{k=1}^K T_\theta(conv(x)_k, conv(x+\delta)_k) - \log\left(\frac{1}{K}\sum_{k=1}^K \exp[T_\theta(conv(x)_k, conv(x+\delta)(k))]\right)$$

7:  θ ← θ + ∇$_\theta$I(θ) I(θ)
  return I(θ)

---

Evaluations of the sampling methods (e.g., random sampling and convolution layer output sampling) using the same training dataset and neural network show that both random sampling and convolution-based approaches can generate high-similarity prediction-evasive adversarial examples despite large $L_\infty$ perturbation. For example, a convolution-based approach can be used when applicable (e.g., machine learning model includes a convolutional neural network) and otherwise random sampling can be used for per-sample mutual information neural estimator.

Mutual Information Neural Estimator-Based Attack Formulation

The system can formalize the attack formulations for supervised and unsupervised adversarial examples using per-sample. In an embodiment, in supervised setting, the system aims to find most similar adversarial examples causing prediction evasion, leading to a mutual information neural estimator maximization problem. On the other hand, in unsupervised setting, the system aims to find least similar adversarial examples but having smaller training loss, leading to a mutual information neural estimator minimization problem. Both problems can be solved efficiently using a unified MinMax algorithm.

Supervised Adversarial Example

Let (x, y) denote a pair a data sample x and the corresponding ground-truth label y. The objective of supervised adversarial example is to find a perturbation δ to x such that the MI estimate $I_\Theta(x, x+\delta)$ is maximized while the resulting prediction of x+δ is different from y (or being a targeted class y'≠y), which is formulated as follows:

$$\underset{\delta}{\text{Maximize}}\ I_\Theta(x, x+\delta)$$

such that $x+\delta \in [0,1]^d$, $\delta \in [-\varepsilon, \varepsilon]^d$ and $$f_x^{sup}(x+\delta) \leq 0$$

The constraint $x+\delta \in [0,1]^d$ ensures $x+\delta$ lies in the (normalized) data space of dimension d, and the constraint $\delta \in [-\varepsilon, \varepsilon]^d$ corresponds to the typical bounded $L_\infty$ norm on the perturbation $\delta$. In an embodiment, the system includes this bounded-norm constraint so that the system can make direct comparisons to other norm-bounded attacks. One can ignore this constraint by setting $\varepsilon=1$. The function $f_x^{sup}(x+\delta)$ is an attack success evaluation function, where $f_x^{sup}(x+\delta) \leq 0$ means $x+\delta$ is a prediction-evasive adversarial example. For example, for untargeted attack one can use the attack function $f_x^{sup}$, which is $$f_x^{sup}(x') = logit(x')_y - \max_{j:j \neq y} logit(x')_j + \kappa$$

where $logit(x')_j$ is the j-th class output of the logit (pre-softmax) layer of a neural network, and $\kappa \geq 0$ is a tunable gap between the original prediction $logit(x')_y$ and the top prediction $\max_{j:j \neq y} logit(x')_j$ of all classes other than y. Similarly, for targeted attack of a class label $y' \neq y$, the attack function can be $$f_x^{sup}(x') = \max_{j:j \neq y} logit(x')_j - logit(x')_{y'} + \kappa$$

Unsupervised Adversarial Example

Many machine learning tasks such as data reconstruction and unsupervised representation learning do not use data labels, which can prevent the use of aforementioned supervised attack functions. For example, the disclosure uses an autoencoder $\Phi(\cdot)$ for data reconstruction to illustrate the unsupervised attack formulation. The design principle can extend to other unsupervised tasks. The autoencoder $\Phi$ takes a data sample x as an input and outputs a reconstructed data sample $\Phi(x)$. Different from the rationale of supervised attack, for unsupervised attack the system may use mutual information neural estimator to find the least similar perturbed data sample $x+\delta$ with respect to x while ensuring the reconstruction loss of $\Phi(x+\delta)$ is no greater than $\Phi(x)$ (i.e., the criterion of successful attack for data reconstruction). In an embodiment, the unsupervised attack formulation is as follows:

$$\underset{\delta}{\text{Minimize}}\ I_\Theta(x, x+\delta)$$

such that $x+\delta \in [0,1]^d$, $\delta \in [-\varepsilon, \varepsilon]^d$ and $$f_x^{unsup}(x+\delta) \leq 0$$

The first two constraints regulate the feasible data space and the perturbation range. For the $L_2$-norm reconstruction loss, the unsupervised attack function is $$f_x^{unsup}(x+\delta) = \|x - \Phi(x+\delta)\|_2 - \|x - \Phi(x)\|_2 + \kappa$$

which means the attack is considered successful (i.e., $f_x^{unsup}(x+\delta) \leq 0$) if the reconstruction loss of $x+\delta$ relative to the original sample x is smaller than the native reconstruction loss minus a nonnegative margin $\kappa$. That is, $\|x - \Phi(x+\delta)\|_2 \leq \|x - \Phi(x)\|_2 - \kappa$. In an embodiment, the unsupervised attack formulation aims to find the most dissimilar perturbed sample $x+\delta$ to x measured by mutual information neural estimator while having smaller reconstruction loss than the that of x. It can be shown that using mutual information neural estimator in unsupervised attack outperforms an alternative objective of maximizing $L_2$ reconstruction loss.

Mutual Information Neural Estimator-Based Attack Algorithm

In an embodiment, the system may implement a MinMax algorithm for solving the aforementioned supervised and unsupervised attack formulations. Its convergence is also described below. For simplicity, the disclosure herein uses $f_x$ to denote the attack criterion for $f_x^{sup}$ or $f_x^{unsup}$. Without loss of generality, the disclosure analyzes the supervised attack objective of maximizing $I_\Theta$ with constraints. The analysis also holds for the unsupervised case since minimizing $I_\Theta$ is equivalent to maximizing $I'_\Theta$, where $I'_\Theta = -I_\Theta$. The disclosure also discusses a penalty-based algorithm as a comparative method to the MinMax algorithm approach disclosed herein.

MinMax Algorithm

In an embodiment, the disclosure may reformulate the attack generation via mutual information neural estimator as the following MinMax optimization problem with simple convex set constraints:

$$\underset{\delta: x+\delta \in [0,1]^d, \delta \in [-\varepsilon,\varepsilon]^d}{\text{Min}}\ \underset{c \geq 0}{\text{Max}}\ F(\delta, c) \overset{\Delta}{=} c \cdot f_x^+(x+\delta) - I_\Theta(x, x+\delta)$$

The outer minimization problem finds the best perturbation $\delta$ with data and perturbation feasibility constraints $x+\delta \in [0,1]^d$ and $\delta \in [-\varepsilon, \varepsilon]^d$, which are both convex sets with known analytical projection functions. The inner maximization associates a variable $c \geq 0$ with the original attack criterion $f_x(x+\delta) \leq 0$, where c is multiplied to the Rectified Linear Unit (ReLU) activation function of $f_x$, denoted as $f_x^+(x+\delta) = \text{ReLU}(f_x(x+\delta)) = \max\{f_x(x+\delta), 0\}$. The use of $f_x^+$ means when the attack criterion is not met (i.e., $f_x(x+\delta) > 0$), the loss term $c \cdot f_x(x+\delta)$ will appear in the objective function F. On the other hand, if the attack criterion is met (i.e., $f_x(x+\delta) \leq 0$), then $c \cdot f_x^+(x+\delta) = 0$ and the objective function F only contains the similarity loss term $-I_\Theta(x, x+\delta)$. Therefore, the design of $f_x^+$ balances the tradeoff between the two loss terms associated with attack success and mutual information neural estimator-based similarity. In an embodiment, the system may use alternative projected gradient descent between the inner and outer steps to solve the MinMax attack problem, which is summarized in Algorithm 1. The parameters $\alpha$ and $\beta$ denote the step sizes of the minimization and maximization steps, respectively. The gradient $\nabla f_x^+(x+\delta)$ with respect to $\delta$ is set to be 0 when $f_x(x+\delta) \leq 0$. The MinMax algorithm returns the successful adversarial example $x+\delta^*$ with the best mutual information neural estimator value $I_\Theta^*(x, x+\delta^*)$ over T iterations. By way of example only, parameter $\alpha$ can be 0.01, parameter $\beta$ can be 0.1 and T can be 40. Those parameters can be provided as input and can be configurable. In an aspect, as iteration count increases, MinMax algorithm can continue improving the MI values.

Algorithm 1
MinMax Attack Algorithm

Input: data sample x, attack criterion $f_x(\cdot)$, step sizes $\alpha$ and $\beta$, perturbation bound $\epsilon$, total # of iterations T
1: Initialize $\delta_0 = 0$, $c_0 = 0$, $\delta^* = $ null, $I_\Theta^* = -\infty$, $t = 1$
2: for t in T iterations do
3:     $\delta_{t+1} = \delta_t - \alpha \cdot (c \cdot \nabla f_x^+(x + \delta_t) - \nabla I_\Theta(x, x + \delta_t))$
4:     Project $\delta_{t+1}$ to $[\epsilon, -\epsilon]$ via clipping
5:     Project $x + \delta_{t+1}$ to $[0,1]$ via clipping
6:     Compute $I_\Theta(x, x + \delta_{t+1})$
7:     Perform $c_{t+1} = \left(1 - \frac{\beta}{t^{1/4}}\right) \cdot c_t + \beta \cdot f_x^+(x + \delta_{t+1})$
8:     Project $c_{t+1}$ to $[0, \infty]$
9:     if $f_x(x + \delta_{t+1}) \leq 0$ and $I_\Theta(x, x + \delta_{t+1}) > I_\Theta^*$ then
10:      update $\delta^* = \delta_{t+1}$ and $I_\Theta^* = I_\Theta(x, x + \delta_{t+1})$
        return $\delta^*, I_\Theta^*$ Penalty-Based Algorithm An alternative approach to solving the mutual information neural estimator-based attack formulation is through the penalty-based method with the objective:

$$\underset{\delta: x+\delta \in [0,1]^d, \delta \in [-\epsilon, \epsilon]^d}{\text{Minimize}} \quad c \cdot f_x^+(x + \delta) - I_\Theta(x, x + \delta)$$

where c is a fixed regularization coefficient instead of an optimization variable. Known methods use a binary search strategy for tuning c and report the best attack results out of different c values. In contrast, the MinMax attack algorithm in an embodiment dynamically adjusts the c value in the inner maximization stage (e.g., step 7 in Algorithm 1). It can be shown that the MinMax algorithm can be more efficient in finding mutual information neural estimator-based adversarial examples than the penalty-based algorithm given the same number of iterations.

Convergence Proof of MinMax Attack

The following describes a convergence proof with the following assumptions on the properties of the considered problem:

A.1: The feasible set $\Delta$ for $\delta$ is compact, and $f_x^+(x+\delta)$ has (well-defined) gradients and function Lipschitz continuity (with respect to $\delta$) with constants $L_f$ and $l_f$. That is, $|f_x^+(x+\delta) - f_x^+(x+\delta')| \leq l_f \|\delta - \delta'\|$ and $\|\nabla f_x^+(x+\delta) - \nabla f_x^+(x+\delta')\| \leq L_f \|\delta - \delta'\|$ for all $\delta, \delta' \in \Delta$. In addition, $I_\Theta(x, x+\delta)$ also has gradient Lipschitz continuity with constant $L_I$.

A.2: The per-sample mutual information neural estimator is $\eta$-stable over attack iterations for the same input. That is, $|I_{\Theta_{t+1}}(x, x+\delta_{t+1}) - I_{\Theta_t}(x, x+\delta_{t+1})| \leq \eta$.

A.1 holds in general for neural networks since the numerical gradient of ReLU activation can be efficiently computed and the sensitivity (Liptichitz constant) against the input perturbation can be bounded. The feasible perturbation set $\Delta$ is compact when the data space is bounded. A.2 can be satisfied by following the consistent estimation proof of the native mutual information neural estimator.

To state a theoretical result, the proximal gradient of the objective function is defined as $$\mathcal{L}(\delta, c) := \begin{bmatrix} \delta - P_\Delta[\delta - \nabla_\delta F(\delta, c)] \\ c - P_C[c + \nabla_c F(\delta, c)] \end{bmatrix}$$

where $P_\chi$ denotes the projection operator on convex set $\chi$, and $\|\mathcal{L}(\delta, c)\|$ is a commonly used measure for stationarity of the obtained solution. In the example case, $\Delta = \{\delta: x + \delta \in [0,1]^d \cap \delta \in [-\epsilon, \epsilon]^d\}$ and $C = \{c: 0 \leq c \leq \bar{c}\}$, where $\bar{c}$ can be an arbitrary large value. When $\|\mathcal{L}(\delta^*, c^*)\| = 0$, then the point $(\delta^*, c^*)$ is refereed as a game stationary point of the min-max problem. Next, the following presents a theoretical result.

Theorem 1. Suppose Assumptions A.1 and A.2 hold and the sequence $\{\delta_t, c_t, \forall t \geq 1\}$ is generated by the MinMax attack algorithm. For a given small constant $\epsilon'$ and positive constant $\beta$, let $T(\epsilon')$ denote the first iteration index such that the following inequality is satisfied: $T(\epsilon') := \min\{t | \|\mathcal{L}(\delta_t, c_t)\|^2 \leq \epsilon', t \geq 1\}$. Then, when the step-size and approximation error achieved by Algorithm 1 satisfy $\alpha \sim \eta \sim \sqrt{1/T(\epsilon')}$, there exists some constant C such that $\|\mathcal{L}(\delta_{T(\epsilon')}, c_{T(\epsilon')})\|^2 \leq C/\sqrt{T(\epsilon')}$.

Theorem 1 states the rate of convergence of the MinMax attack algorithm in an embodiment, when provided with sufficient stability of mutual information neural estimator and proper selection of the step sizes. Under the assumptions and conditions of step-sizes, this convergence rate can be standard in the problems of non-convex min-max saddle point problems.

Data Augmentation Using Unsupervised Adversarial Example (UAE)

In am embodiment, with the MinMax attack algorithm and per-sample mutual information neural estimator for similarity evaluation, the system can generate mutual information neural estimator-based supervised and/or unsupervised adversarial examples (UAEs). As novel applications of UAEs, mutual information neural estimator-based UAEs can be used as a simple plug-in data augmentation tool to boost the model performance of several unsupervised machine learning tasks. Significant and consistent performance improvement can be observed in data reconstruction, representation learning (e.g., increase in accuracy), and contrastive learning (e.g., increase in accuracy). The observed performance gain may be attributed to the fact that the UAEs correspond to "on-manifold" data samples having smaller training loss but are dissimilar to the training data, causing generalization errors. Therefore, data augmentation and retraining with UAEs can improve generalization.

In an aspect, a mutual information neural estimator-based MinMax adversarial attack algorithm disclosed herein can work with a variety of datasets and models such as neural network models. The generated UAEs can be used for data augmentation in those dataset and models. Examples of datasets can include, but are not limited to, grayscale images of hand-written digits, image dataset set of house numbers from street view images, grayscale images of clothing items, preprocessed speech data, grayscale images of objects, each object having multiple-view images taken at pose intervals of 5 degrees, leading to multiple images per object, the expression levels of protein modifications that produced detectable signals in the nuclear fraction of cortex, in which each feature is the protein expression level, sensor data, and/or others.

For supervised adversarial example setting, both data samples and their labels can be used. The attack success rate (ASR) can be measured as the fraction of the final perturbed samples leading to misclassification.

In unsupervised adversarial example setting, only the training data samples are used. In an aspect, their true labels can be used in the post-hoc analysis for evaluating the quality of the associated unsupervised learning tasks. All training data can be used for generating UAEs individually by setting κ=0, where a perturbed data sample is considered as a successful attack if its loss (relative to the original data sample) is no greater than the original training loss. For data augmentation, in an embodiment, if a training sample fails to find a successful attack, the training sample can be replicated to the augmented dataset in order to maintain data balance during model retraining. For evaluation, the ASR can be measured on the training data, and the reported model performance can be evaluated on the test data.

Figure 2:
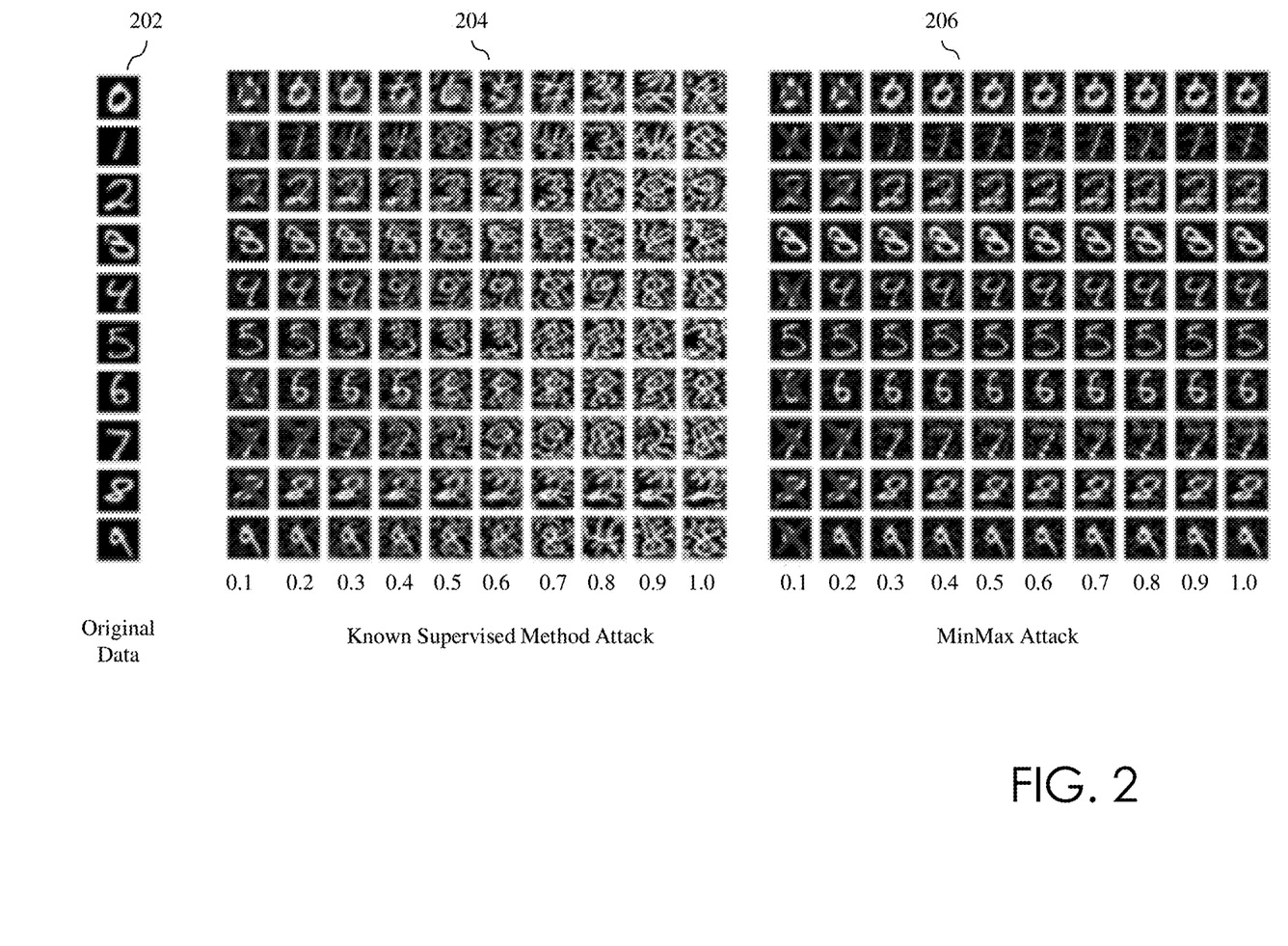
FIG. 2 shows a visual comparison of adversarial examples on example dataset in an embodiment.

FIG. 2 shows a visual comparison of adversarial examples on example dataset in an embodiment. Unsuccessful adversarial examples are marked with the cross sign. Each row shows the crafted adversarial examples of an original sample 202. Each column corresponds to different ε values ($L_\infty$-norm perturbation bound) ranging from 0.1 to 1.0. MinMax attack using mutual information neural estimator 206 yields adversarial examples with better visual quality than a known supervised method attack 204, even for large ε values. In an embodiment, MinMax attack uses mutual information neural estimator as an additional similarity regulation. The results validate that mutual information neural estimator can be used as an effective similarity metric. In an embodiment, in performing mutual information neural estimator-based attacks, the $L_\infty$ norm constraint need not be used (e.g., by setting ε=1), e.g., so that the algorithm can fully leverage the power of MI to find a more diverse set of adversarial examples.

UAE can improve unsupervised learning tasks such as reconstruction, representation learning, contrastive learning and/or others. In an embodiment, the system may only use the training samples and the associated training loss function to generate UAEs. A post-hoc analysis can show the performance on the test data and the downstream classification accuracy. The following unsupervised learning tasks are described only as examples. The system may work with any other machine learning models and associated training datasets.

Data reconstruction using an autoencoder Φ(•) that learns to encode and decode the raw data through latent representations is an unsupervised machine learning task. By way of example, the default implementation of the following four different autoencoders can be used to generate UAEs based on the training data samples of example datasets for data augmentation, retrain the model from scratch on the augmented dataset, and report the resulting reconstruction error on the original test set. In an embodiment, all autoencoders use the $L_2$ reconstruction loss defined as $\|x-\Phi(x)\|_2$.

Dense Autoencoder: The encoder and decoder have 1 dense layer separately and the dimension of the latent space, for example, is 128/256 for MNIST/SVHN.

Sparse Autoencoder: It has a sparsity enforcer ($L_1$ penalty on the training loss) that directs a network with a single hidden layer to learn the latent representations minimizing the error in reproducing the input while limiting the number of code words for reconstruction. The same architecture as Dense Autoencoder for example dataset can be used.

Convolutional Autoencoder: The encoder includes convolution, relu, and pooling layers. In the decoder, the layer order is reversed and the pooling layer is replaced by an unsampling layer.

Adversarial Autoencoder: It is composed of an encoder, a decoder and a distinguisher. The rationale is to force the distribution of the encoded values to be similar to the prior data distribution.

The performance of the mutual information neural estimator-based UAE can also be compared with two baselines: (i) $L_2$-UAE that replaces the objective of minimizing $I_\Theta(x, x+\delta)$ with maximizing the $L_2$ reconstruction loss $\|x-\Phi(x+\delta)\|_2$ in the MinMax attack algorithm for finding dissimilar examples that yield smaller reconstruction loss than the original sample. (ii) Gaussian augmentation (GA) that adds zero-mean Gaussian noise with a diagonal covariance matrix of the same constant $\sigma^2$ to the training data.

The improvement of reconstruction error can be measured with respect to the reconstruction loss of the original model (i.e., without data augmentation). It is shown that mutual information neural estimator-UAE can attain higher ASR than $L_2$-UAE and GA. Data augmentation using mutual information neural estimator-UAE achieves consistent and significant reconstruction performance improvement across all models and datasets, validating the effectiveness of using mutual information neural estimator-UAE for data augmentation. The results suggest that mutual information neural estimator-UAE can be an effective and plug-in data augmentation tool for unsupervised machine learning models, as in an embodiment it simply uses the training data and the original model to generate UAEs for model retraining. It can further be demonstrated that augmented UAEs can improve data reconstruction, e.g., in an original model involving augmented training data such as flip, rotation, and Gaussian noise.

A concrete autoencoder is an unsupervised feature selection method which recognizes a subset of the most informative features through an additional concrete select layer with M nodes in the encoder for data reconstruction. In an embodiment, the mutual information neural estimator-UAE technique disclosed herein can be applied to such concrete autoencoder. For example, mutual information neural estimator-UAE can be applied for data augmentation on a variety of datasets. A post-hoc classification evaluation procedure for the learned representations can be used, which passes the selected features to a randomized tree classification model. By way of example, M=50 features can be selected for dataset. It is shown that mutual information neural estimator-UAE can attain improvement for data reconstruction and increase in accuracy in datasets, corroborating the utility of mutual information neural estimator-UAE in representation learning and feature selection.

The mutual information neural estimator-UAE technique can also be applied to contrastive learning of visual representations. For instance, mutual information neural estimator-UAEs can be generated using the training data and the defined constrastive training loss of a contrastive learning model. It can be shown that using mutual information neural estimator-UAE for data augmentation and model retraining can yield improvement in contrastive loss and increase in the classification accuracy, suggesting advanced contrastive learning performance via data augmentation disclosed herein.

In an embodiment, adversarial examples can be generated in unsupervised learning tasks, based on a per-sample mutual information neural estimator as an information-theoretic similarity measure. In an embodiment, a new MinMax algorithm is disclosed for efficient generation of mutual information neural estimator-based supervised and unsupervised adversarial examples. As a novel application, mutual information neural estimator-based UAEs can be used as a simple yet effective plug-in data augmentation tool, which can achieve performance gains in machine learning models such as, but not limited to, data reconstruction, representation learning, and contrastive learning across different datasets and neural network models.

The systems and methods in one or more embodiments can generate adversarial examples for unsupervised models and provide novel applications to data augmentation. A technique which exploits a mutual information neural estimator as an information-theoretic similarity measure can be provided to generate adversarial examples without supervision. In an embodiment, a new MinMax algorithm with provable convergence is provided for efficient generation of unsupervised adversarial examples. In an embodiment, unsupervised adversarial examples can be used as a plug-in data augmentation tool for model retraining, which can provide improvements across different unsupervised tasks and datasets, for example, including data reconstruction, representation learning, and contrastive learning. In an aspect, robustness of unsupervised learning problems can be improved via adversarial examples. For instance, unsupervised adversarial examples can be used to improve model performance.

In an embodiment, a method can be provided for generating adversarial examples for machine learning models in an embodiment. The method in an embodiment generates adversarial examples for machine learning models for unsupervised learning tasks, for example, as well as for supervised tasks. For instance, a trained machine learning model along with data it was trained with can be received. Using the received trained model and training data, unsupervised adversarial examples can be generated. The trained model can be tested, for example, for robustness, using the generated unsupervised adversarial examples. The received data can be augmented with the generated unsupervised adversarial examples. The model can be retrained using the augmented data. The process of generating unsupervised adversarial examples, augmenting the training data and retraining the mode can repeat or iterate multiple times.

Figure 3:
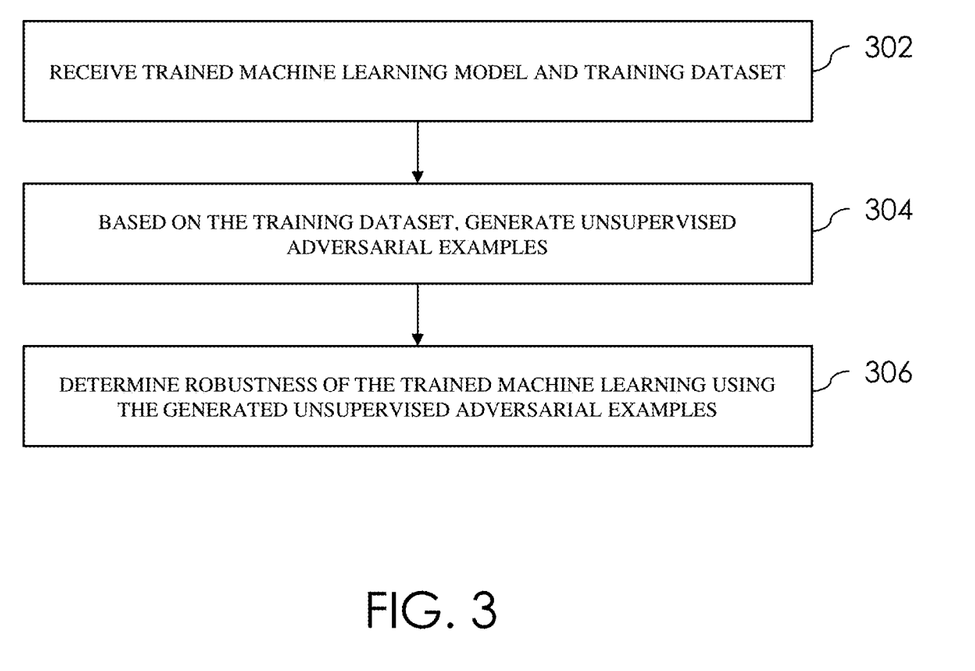
FIG. 3 is a flow diagram illustrating a method of generating adversarial examples for machine learning models in an embodiment.

FIG. 3 is a flow diagram illustrating a method of generating adversarial examples for machine learning models in an embodiment. The method can be performed by one or more processors such as hardware processors. At 302, a trained machine learning model and training dataset, which was used to train the machine learning model can be received. The machine learning model can be a neural network model. The machine learning model can be unsupervised machine learning model. Examples of unsupervised machine learning models include, but are not limited to, autoencoders, representation learning and contrastive learning models.

At 304, based on the training dataset, unsupervised adversarial examples are generated. In an embodiment, generating the unsupervised adversarial examples can include using a per-sample mutual information neural estimator for measuring the similarity between an adversarial sample and an original sample, the original sample being from the training dataset. The generating step looks for or finds an adversarial example which is least similar to the original sample, while also satisfying an adversarial criterion that the adversarial example's loss is less than that of the original sample. In an embodiment, the adversarial sample can be randomly sampled. In another embodiment, the adversarial sample can be sampled using an output of a convolutional layer of the trained machine learning model. In an embodiment, a min-max algorithm which finds the adversarial example that has minimum training loss and least similarity to the original sample can be solved.

At 306, robustness of the trained machine learning model can be determined using the generated unsupervised adversarial examples. For instance, the trained machine learning model can be tested using the generated unsupervised adversarial examples.

In another aspect, the training dataset can be augmented with the generated unsupervised adversarial examples. Trained machine learning model can be retrained using the augmented training dataset.

Figure 4:
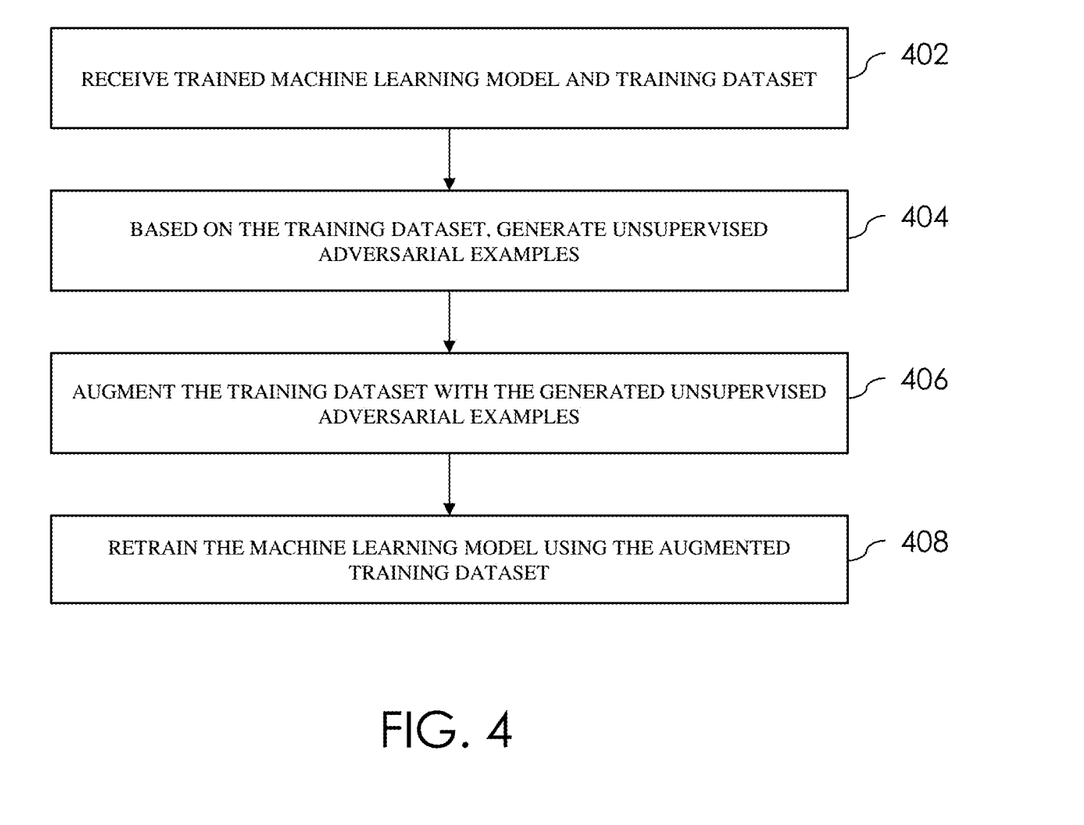
FIG. 4 is another flow diagram illustrating a method of generating adversarial examples for machine learning models in an embodiment.

FIG. 4 is another flow diagram illustrating a method generating adversarial examples for machine learning models in an embodiment. The method can be performed by one or more processors such as hardware processors. At 402, a trained machine learning model and training dataset, which was used to train the machine learning model can be received. The machine learning model can be a neural network model. The machine learning model can be unsupervised machine learning model. Examples of unsupervised machine learning models include, but are not limited to, autoencoders, representation learning and contrastive learning models.

At 404, based on the training dataset, unsupervised adversarial examples are generated. In an embodiment, generating the unsupervised adversarial examples can include using a per-sample mutual information neural estimator for measuring the similarity between an adversarial sample and an original sample, the original sample being from the training dataset. The generating step looks for or finds an adversarial example which is least similar to the original sample, while also satisfying an adversarial criterion that the adversarial example's loss is less than that of the original sample. In an embodiment, the adversarial sample can be randomly sampled. In another embodiment, the adversarial sample can be sampled using an output of a convolutional layer of the trained machine learning model. In an embodiment, a min-max algorithm which finds the adversarial example that has minimum training loss and least similarity to the original sample can be solved.

At 406, the training dataset is augmented with the generated unsupervised adversarial examples. At 408, the trained machine learning model can be retrained using the augmented training dataset. In an embodiment, the processing at 404, 406 and 408 can repeat. The machine learning model can also be tested, for example, for its robustness, using the generated unsupervised adversarial examples.

Figure 5:
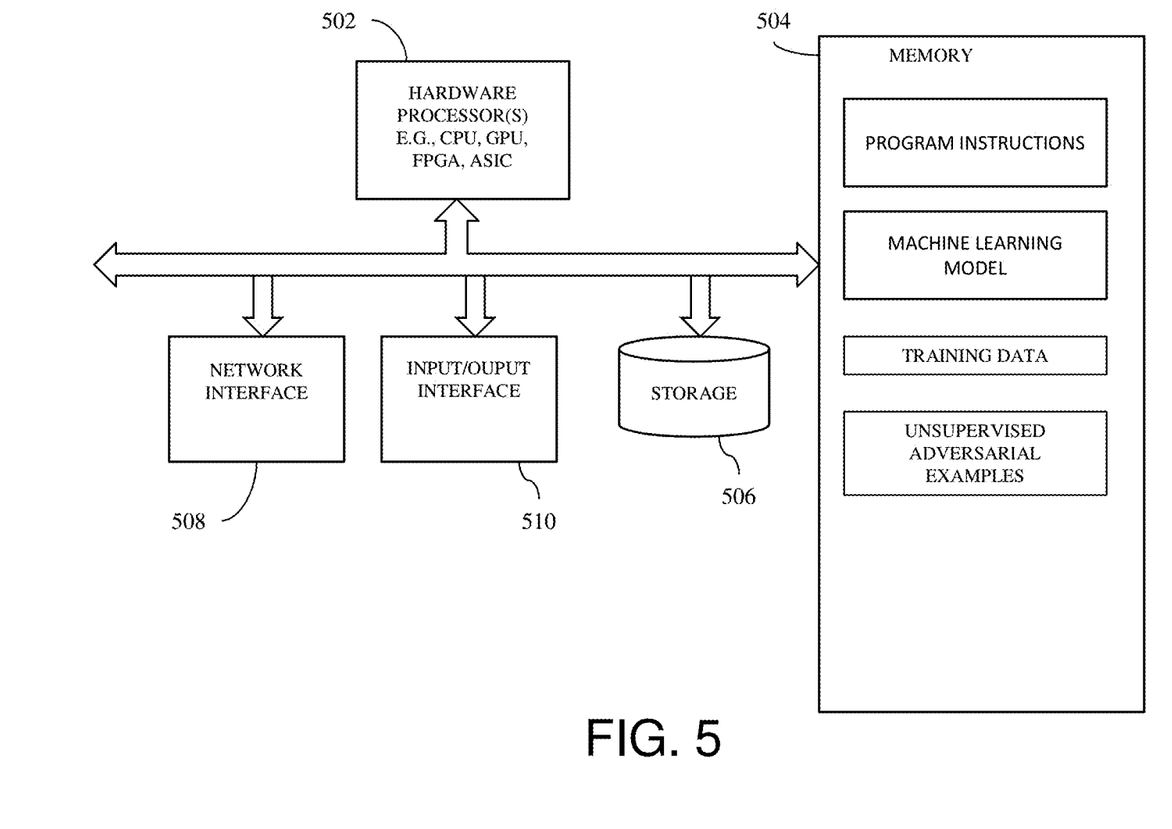
FIG. 5 is a diagram showing components of a system in one embodiment that generates adversarial examples in machine learning.

FIG. 5 is a diagram showing components of a system in one embodiment that generates adversarial examples in machine learning. One or more hardware processors 502 such as a central processing unit (CPU), a graphic process unit (GPU), and/or a Field Programmable Gate Array (FPGA), an application specific integrated circuit (ASIC), and/or another processor, may be coupled with a memory device 504, and generate adversarial examples for machine learning. A memory device 504 may include random access memory (RAM), read-only memory (ROM) or another memory device, and may store data and/or processor instructions for implementing various functionalities associated with the methods and/or systems described herein. One or more processors 502 may execute computer instructions stored in memory 504 or received from another computer device or medium. A memory device 504 may, for example, store instructions and/or data for functioning of one or more hardware processors 502, and may include an operating system and other program of instructions and/or data. One or more hardware processors 502 may receive input including a trained machine learning model and a training dataset, which was used to train the machine learning model. For instance, at least one hardware processor 502 may generate adversarial examples for unsupervised learning tasks. At least one hardware processor 502 can also generate adversarial examples for supervised learning tasks. In one aspect, the machine learning model and/or the training dataset may be stored in a storage device 506 or received via a network interface 508 from a remote device, and may be temporarily loaded into a memory device 504 for generating adversarial examples. The adversarial examples can be used to test the machine learning model and/or augment the training dataset. The augmented dataset can be further used to retrain the machine learning model. One or more hardware processors 502 may be coupled with interface devices such as a network interface 508 for communicating with remote systems, for example, via a network, and an input/output interface 510 for communicating with input and/or output devices such as a keyboard, mouse, display, and/or others.

Figure 6:
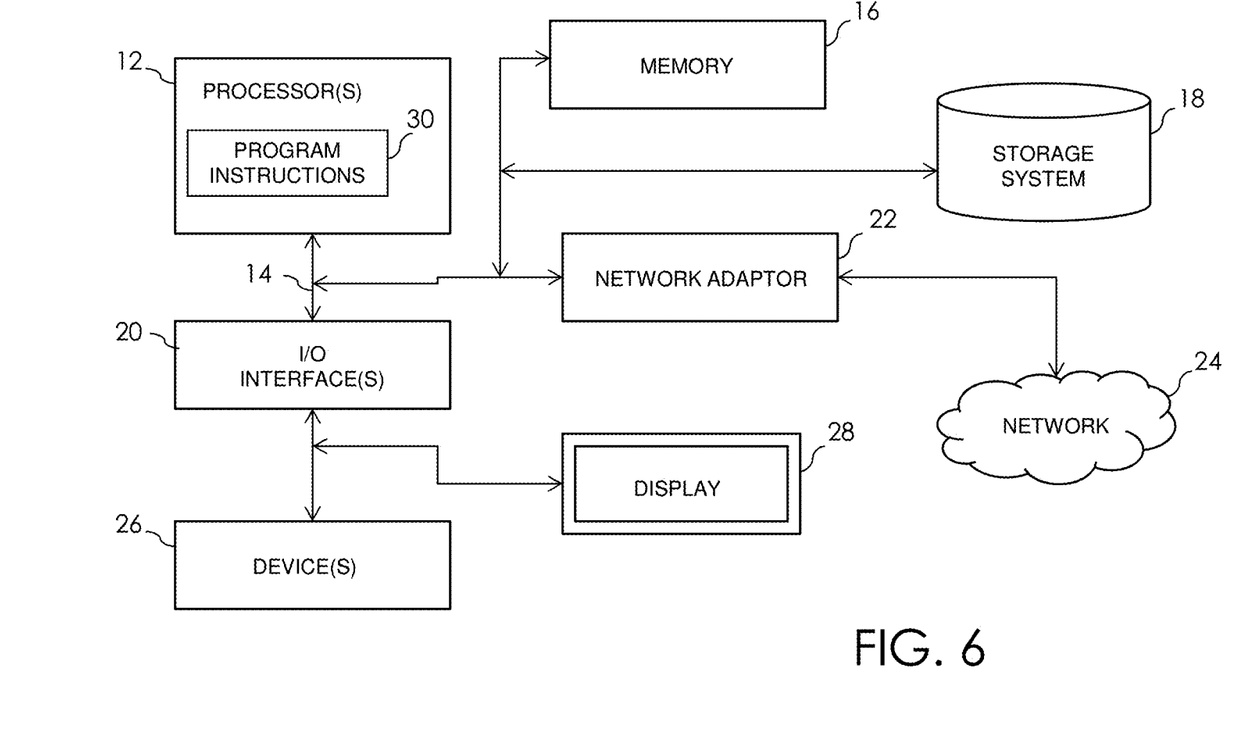
FIG. 6 illustrates a schematic of an example computer or processing system that may implement a system in one embodiment.

FIG. 6 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be appar-

What is claimed is:

1. A computer-implemented method comprising:
receiving a trained machine learning model and a training dataset used to train the trained machine learning model;
based on the training dataset and a loss function of the trained machine learning model, generating images representing adversarial examples, the adversarial examples being perturbed samples of the training dataset, the generating creating an adversarial example which is least similar to an original sample in the training dataset, and also satisfying an adversarial criterion that a loss associated with the adversarial example is less than that of the original sample in the training dataset;
determining robustness of the trained machine learning model using the generated adversarial examples;
augmenting the training dataset with the generated images representing adversarial examples;
retraining the trained machine learning model using the augmented training dataset;
performing by the retrained machine learning model, image classification; and
displaying the original sample, a generated image representing the adversarial example, and a reconstructed image reconstructed using the retrained machine learning model.

2. The method of claim 1, wherein the adversarial example is randomly sampled.

3. The method of claim 1, wherein the adversarial example is sampled using an output of a convolutional layer of the trained machine learning model.

4. The method of claim 1, wherein the generating of the adversarial examples includes solving a minmax algorithm which finds the adversarial example that has minimum training loss and least similarity to the original sample.

5. The method of claim 1, wherein the trained machine learning model includes a neural network model.

6. The method of claim 1, wherein the trained machine learning model includes an autoencoder.

7. The method of claim 1, wherein the trained machine learning model includes a representation learning model.

8. The method of claim 1, wherein the trained machine learning model includes a contrastive learning model.

9. The method of claim 1, wherein the trained machine learning model includes an unsupervised machine learning model.

10. A computer program product comprising a non-transitory computer readable storage medium having program instructions embodied therewith, the program instructions readable by a device to cause the device to:
receive a trained machine learning model and a training dataset used to train the trained machine learning model;
based on the training dataset and a loss function of the trained machine learning model, generate mages representing adversarial examples, the adversarial examples being perturbed samples of the training dataset, the generating creating an adversarial example which is least similar to an original sample in the training dataset, and also satisfying an adversarial criterion that a loss associated with the adversarial example is less than that of the original sample in the training dataset;
augment the training dataset with the generated images representing adversarial examples;
retrain the trained machine learning model using the augmented training dataset;
perform by the retrained machine learning model, image classification; and
display the original sample, a generated image representing the adversarial example, and a reconstructed image reconstructed using the retrained machine learning model.

11. The computer program product of claim 10, wherein the device is caused to determine robustness of the trained machine learning model using the generated adversarial examples.

12. The computer program product of claim 10, wherein the adversarial sample is randomly sampled.

13. The computer program product of claim 10, wherein the adversarial sample is sampled using an output of a convolutional layer of the trained machine learning model.

14. The computer program product of claim 10, wherein the generating adversarial examples includes solving a minmax algorithm which finds the adversarial example that has minimum training loss and least similarity to the original sample.

15. A system comprising:
a hardware processor; and
a memory device coupled with the hardware processor;
the hardware processor configured to:
receive a trained machine learning model and a training dataset used to train the trained machine learning model;
based on the training dataset and a loss function of the trained machine learning model, generate images representing adversarial examples, the adversarial examples being perturbed samples of the training dataset, the generating creating an adversarial example which is least similar to an original sample in the training dataset, and also satisfying an adversarial criterion that a loss associated with the adversarial example is less than that of the original sample in the training dataset;
determine robustness of the trained machine learning model using the generated adversarial examples;
augment the training dataset with the generated images representing adversarial examples;
retrain the trained machine learning model using the augmented training dataset;
perform by the retrained machine learning model, image classification; and
display the original sample, a generated image representing the adversarial example, and a reconstructed image reconstructed using the retrained machine learning model.

* * * * *